March 23, 1971 J. C. H. DAVIS ET AL 3,572,358
FLUIDIC FREQUENCY SENSORS
Filed Feb. 17, 1969 2 Sheets-Sheet 1
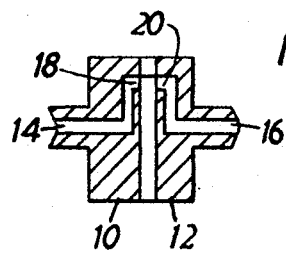
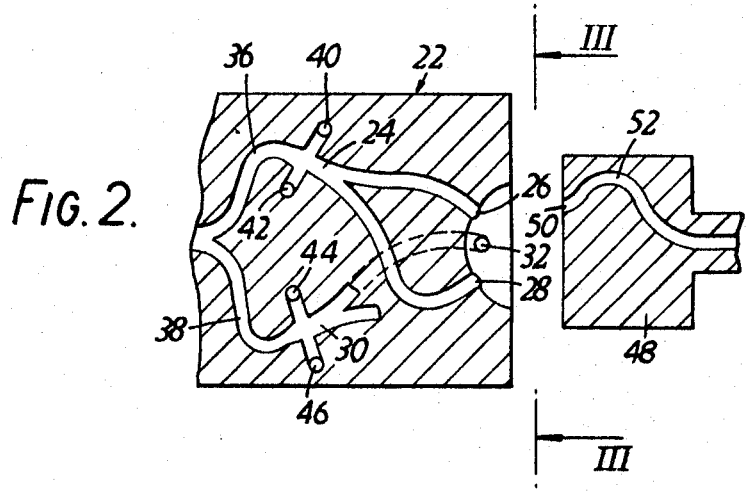
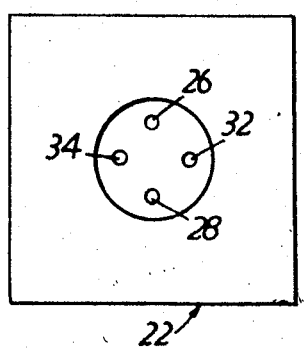
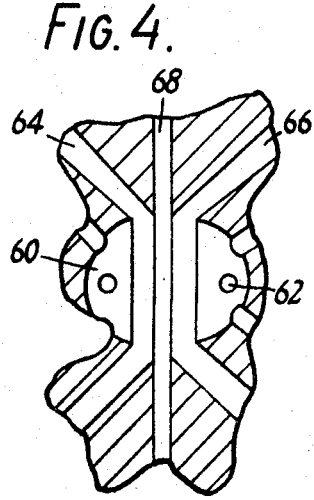
INVENTORS
JOHN CHRISTOPHER HAMMOND DAVIS
GUY EDWARD DAVIES
BY Young + Thompson
ATTYS.

United States Patent Office 3,572,358
Patented Mar. 23, 1971

3,572,358
FLUIDIC FREQUENCY SENSORS
John Christopher Hammond Davis and Guy Edward Davies, Taplow, England, assignors to British Telecommunications Research Limited, Taplow, England
Continuation-in-part of application Ser. No. 774,924, Nov. 12, 1968. This application Feb. 17, 1969, Ser. No. 799,725
Int. Cl. F15c 4/00
U.S. Cl. 137—81.5          10 Claims

ABSTRACT OF THE DISCLOSURE

Apparatus for determining the difference between the speeds of rotation of two bodies or between the frequencies of two pressure signals comprises means for producing a jet of fluid arranged to rotate in phase with one of the bodies or one of the pressure signals. Either a receiver or a second jet of fluid is arranged to rotate in phase with the other body or pressure signal. In the case of the rotating receiver, an output pulse is produced by the receiver when it is in alignment with the jet and this occurs once during each relative rotation period. In the case of the second rotating jet of fluid, the two jets are arranged to interact once during each rotation period and, when interacting, to direct a combined jet into a stationary collector which is so positioned that it cannot receive a signal from either jet alone.

REFERENCE TO RELATED APPLICATION

This application is a continuation-in-part of our application Ser. No. 774,924, filed Nov. 12, 1968, now abandoned.

This invention relates to fluidic rotation speed sensors and fluidic frequency sensors and more particularly to devices for determining the difference between the speeds of rotation of two bodies or between the frequencies of two fluid pressure signals.

At present, when it is required to compare speeds of rotation using a fluidic arrangement, it is customary to produce pressure signals having the same frequency as that of the respective frequencies of rotation and then either to pass the signals through a filter network and to compare the resulting signal amplitudes or to produce square wave signals from the pressure signals and to compare the timings of the edges of the square waves. The accuracy of the former is limited by the relatively poor quality of fluidic filters, which are available at the present time and by the non-linearity and noise produced by the turbulence. The accuracy of the latter alternative is limited by the relatively slow speeds and poor accuracy of time discrimination of the fluidic devices. In other words, both arrangements, which operate at the frequencies of rotation of the rotating bodies, have their accuracy limited by the performance of fluidic devices at such frequencies.

According to the invention, apparatus for comparing two frequencies comprises means for producing a jet of fluid which rotates about an axis in phase with a first of the two frequencies and means responsive to the second of the two frequencies for causing the jet of fluid to be directed into a collector on successive occasions to produce a series of output pulses the repetition frequency of which is dependent on the relation between the two frequencies.

The invention can also be used to compare the frequency and phase of a signal with that of a rotating body.

The invention will be more readily understood from the following detailed description with reference to the accompanying drawings, in which:

FIG. 1 is a sectional view of one embodiment of the invention;

FIG. 2 is a sectional view of another embodiment of the invention;

FIG. 3 is a sectional view taken on the line III—III of FIG. 2;

FIG. 4 is a sectional view of a further embodiment of the invention;

Figure 5:
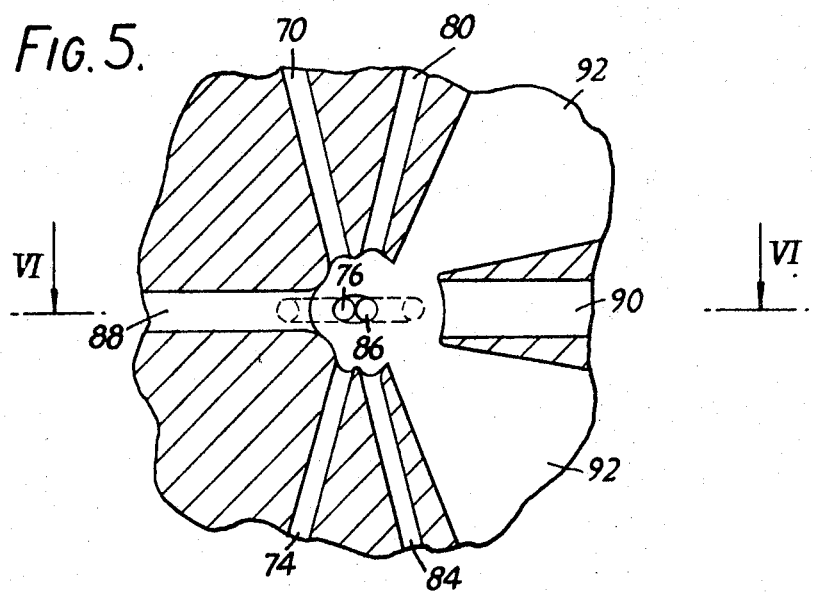
FIG. 5 is a vertical sectional view of another embodiment of the invention.
Figure 6:
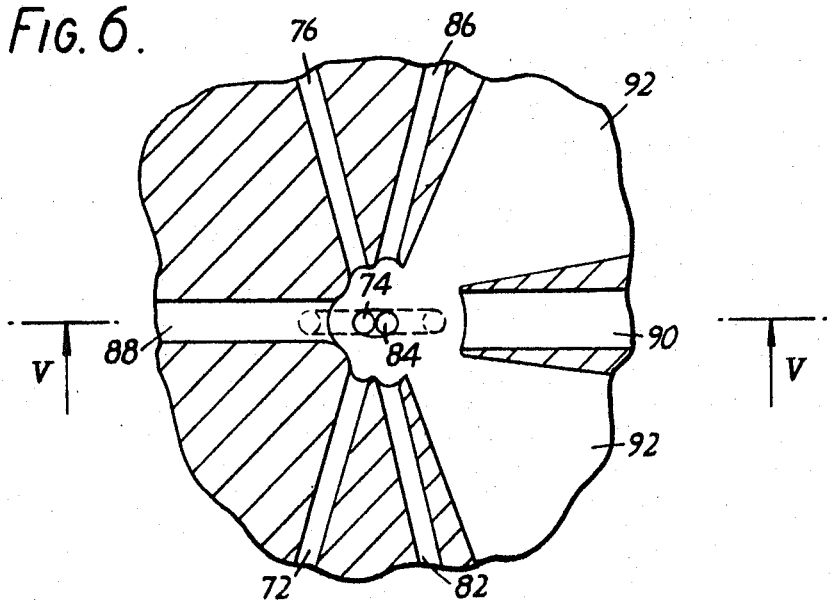
FIG. 6 is a horizontal sectional view taken on the line VI—VI in FIG. 5 and showing the line V—V on which the section of FIG. 5 is taken.

Referring first to FIG. 1, a pair of discs 10 and 12 are mounted for rotation about a common axis. Each disc is ararnged to rotate at the same frequency as a respective one of the two bodies or pressure signals. Each of the discs 10 and 12 is provided with a respective axial duct 14, 16 which terminates in an eccentric port 18, 20 in the surface of the respective disc 10, 12 which confronts the other disc. The two ports 18 and 20 are disposed at the same radial distance from the common axis so that they are aligned with each other once during each relative revolution of the two discs 10 and 12.

A continuous fluid pressure signal is applied to the duct 14. Consequently a fluid pressure pulse is produced in the duct 16 once during each relative revolution of the two discs 10 and 12. Thus the frequency of these pulses is equal to frequency of relative rotation of the two discs 10 and 12 and the signals occur when the discs are in phase.

If it is desired to obtain more precise information about the relative phase of the two discs 10 and 12, more ports may be provided on one or both of the discs. The output signal then has a frequency which is a multiple of the frequency of relative rotation.

If specially shaped orifices are used an output having a sine or other waveshape can be produced. If sufficient circumferentially spaced ports are provided, a continuous sine wave output can be produced.

It will be realised that the orifice 18 in the disc 10 produces what is in effect a rotating jet of fluid. Referring to FIGS. 2 and 3, the same effect can be produced by using a pure fluid device 22 for producing a rotating jet of fluid. A momentum-interaction device 24 is arranged with its outputs 26 and 28 symmetrically disposed relative to the axis about which the jet is to rotate and serves to direct two jets of fluid in a plane containing such axis and the ports 26 and 28. Since the two ports 26 and 28 are symmetrically disposed about the axis of rotation the respective axes of the two jets intersect at a point on such axis.

A momentum-interaction device 30 is arranged with its output ports 32 and 34 symmetrically disposed relative to the axis about which the jet is to rotate but with their common axial plane at right angles to that containing the output ports 26 and 28 of the other device. The arrangement is such that the centres of the jets from the ports 32 and 34 intersect at the same point as those from the ports 26 and 28, equality of supply pressure being ensured by connecting the inlet ports 36 and 38 of the two devices 24 and 30 to a common supply.

In operation, the control ports 40 and 42 of the proportional device 24 are supplied with a first sinusoidal signal and the control ports 44 and 46 of the proportional device 30 are supplied with a second sinusoidal signal 90° out of phase with the first. The resultant output from the two proportional devices 24 and 30 is a rotating jet the direction of rotation of which depends on which of the two sinusoidal signals leads the other. The rotating jet is directed onto the surface of a rotating disc 48 which is similar to the disc 12 of FIG. 1 except that port 50 therein has its axis so aligned to the axis of rotation that on rotation it describes a cone having the same apex and angle as the cone described by the rotating jet. When the rotation jet impinges on the port 50 a pressure signal is produced in duct 52.

As with the embodiment shown in FIG. 1, more information may be obtained about relative phase if more ports are provided in the disc 48.

FIG. 4 shows an arrangment using two rotating jets produced by pure fluid devices. Two pure fluid devices 60 and 62, both similar to the device 22 of FIGS. 2 and 3 are disposed confronting each other so that, when their respective rotating jets are in phase, they interact at some distance from the axis of rotation. An annular vent 64 is disposed round the device 60 and so aligned that the rotating jet from the device 62 is directed thereat when it is not interacting with the other rotating jet from the device 60. A similar annular vent 66 round the device 62 serves the same purpose in respect of the rotating jet from the device 60.

An annular collector 68 is disposed between the two annular vents 64 and 66. In operation, when the two jets are in phase, they interact to produce a combined jet which is directed towards the collector 68. Consequently a fluid pressure signal is produced at the collector 68.

With the arrangement shown in FIG. 4, the output signal is dispersed round the annular collector 68. Consequently the rotating jets must have a relatively large flow rate if an output signal of satisfactory magnitude is to be produced.

FIG. 5 shows an alternative arrangement to that shown in FIG. 4 which can operate at lower flow rates. The arrangement has similarities to that shown in FIG. 4 in that two sets of 4 circumferentially spaced ports 70, 72, 74 and 76 and 80, 82, 84 and 86 are circumferentially spaced around a common axis. However, the disposition of the ports differs from that of the corresponding ports of the arrangement shown in FIG. 4 in that the port 70 exactly confronts the port 84, the port 72 confronts the port 86, the port 74 confronts the port 80 and the port 76 confronts the port 82. Thus, if each set of ports is used to produce a rotating jet of fluid in the manner already described, and the rotating jet produced by the ports 70, 72, 74 and 76 is exactly in antiphase with the jet produced by the ports 80, 82, 84 and 86, the two jets oppose each other and, if they are of equal strength, no resultant jet is produced.

An additional supply port 88 is arranged to direct a steady jet of fluid along the axis about which the two sets of jets 70 to 76 and 80 to 86 are disposed. A collector 90, disposed on this axis is arranged to receive the jet from the port 88 if it is not in any way deflected. The collector 90 is surrounded by an annular vent 92.

As already stated, if the two rotating jets produced by the two ports 70 to 76 and 80 to 86 are exactly antiphase, no resultant jet is produced and consequently the jet from the port 88 is not deflected and is received by the collector. However, when the two rotation jets are not in antiphase, a resultant jet of fluid is produced which directs the jet of fluid from the port 88 away from the collector 90 and into the vent 92. Thus, the collector 90 receives an output signal at a frequency equal to the difference between the frequencies of rotation of the two rotating jets.

If it is desired to determine which of the frequencies of the two rotating jets is the larger, three or more devices of the type shown in FIG. 5 can be used. One set of four ports of all the devices is supplied with the same set of signals. For the other set of ports, a separate set of signals is produced for each device, all such signals having the same frequency but differing from each other in phase.

The identity of the larger input frequency can then be determined by determining the order in which the various collectors of the three or more devices receive output signals.

It will be realised that, in the case of any of the devices shown in FIGS. 2 to 5, it is not necessary to use four nozzles to produce a rotating jet. Any number of nozzles greater than two may be used provided that the maximum angle between adjacent nozzles is less than 180° and that the signals supplied to the various nozzles differ in phase angle by amounts equal to the angular distance between such nozzles.

We claim:

1. Apparatus for comparing two frequencies comprising means for producing a jet of fluid which rotates about an axis displaced from the centre of the jet in phase with a first of the two frequencies, a collector and means responsive to the second of the two frequencies for causing the jet of fluid to be directed into said collector on successive occasions to produce a series of output pulses the repetition frequency of which is dependent on the relation between the two frequencies.

2. Apparatus as claimed in claim 1 in which said means for producing said rotating jet of fluid comprises at least three nozzles symmetrically disposed about said axis for directing respective jets of fluid on to a common point on the axis, means being provided for supplying respective oscillating fluid pressure signals to each nozzle having a frequency equal to the required speed of rotation of the jet and a phase difference between signals applied to adjacent nozzles equal to the angle subtended by such nozzles at the axis.

3. Apparatus as claimed in claim 1, in which the collector is arranged to rotate about said axis at a speed dependent on the second frequency and to be in alignment with the jet of fluid once during each period of relative rotation of the jet and collector.

4. Apparatus as claimed in claim 3, in which the means for producing the jet of fluid comprises a nozzle arranged to be rotatable about said axis.

5. Apparatus as claimed in claim 1, in which the collector is stationary and means are provided for producing a second rotating jet of fluid which rotates about said axis at a speed dependent on a second frequency, the two jets of fluid being arranged to produce a combined jet of fluid directed into the collector when such rotating jets have a predetermined phase relationship with each other.

6. Apparatus as claimed in claim 5 in which said means for producing said second rotating jet of fluid comprises at least three nozzles symmetrically disposed about said axis for directing respective jet of fluid on to a common point on the axis, means being provided for supplying respective oscillating fluid pressure signals to each nozzle having a frequency equal to the required speed of rotation of the jet and a phase difference between signals applied to adjacent nozzles equal to the angle subtended by such nozzles at the axis.

7. Apparatus as claimed in claim 5, in which the two rotating jets of fluid are arranged to be disposed at respective different angles to said axis so that their centres intersect at a point offset with respect to the axis, the collector being annular and so disposed as to receive an output signal only when the two jets intersect.

8. Apparatus as claimed in claim 5 in which the means for producing said rotating jets of fluid each comprises at least three nozzles symmetrically disposed about said axis for directing respective jets of fluid on to a common point on the axis, means being provided for supplying respective oscillating fluid pressure signals to each nozzle having a frequency equal to the required speed of rotation of the jet and a phase difference between signals applied to adjacent nozzles equal to the angle subtended by such nozzles at the axis.

9. Apparatus as claimed in claim 8 in which the means for producing a rotating jet of fluid comprises an even number of nozzles and each of the two outputs of a respective momentum interaction device is arranged to supply fluid pressure signals to respective ones of each diametrically opposed pair of nozzles.

10. Apparatus as claimed in claim 8 in which the two rotating jets of fluid are arranged to be so disposed that their centres intersect on said axis, an additional nozzle is arranged to direct a jet of fluid along said axis and the collector is disposed on said axis confronting the additional nozzle whereby the two rotating jets displace the jet from the additional nozzle away from said axis except when the two rotating jets are in antiphase.

References Cited

UNITED STATES PATENTS

| | | | |
|---|---|---|---|
| 3,348,562 | 10/1967 | Ogren | 137—81.5 |
| 3,373,759 | 3/1968 | Adams | 137—81.5 |
| 3,410,290 | 11/1968 | Phillips | 137—81.5 |
| 3,446,228 | 5/1969 | Stouffer et al. | 137—81.5 |
| 3,447,383 | 6/1969 | Camarata | 137—81.5X |
| 3,452,768 | 7/1969 | Sieracki | 137—81.5X |
| 3,468,326 | 9/1969 | Cohen | 137—81.5 |
| 3,476,131 | 11/1969 | Davison et al. | 137—81.5 |

SAMUEL SCOTT, Primary Examiner